(12) United States Patent
Lee

(10) Patent No.: US 6,750,410 B2
(45) Date of Patent: Jun. 15, 2004

(54) ELECTRIC OUTLET WITH ROTATABLE RECEPTACLES

(76) Inventor: Jae Ha Lee, 603-215 Samick Green 2 Apt. 15 Myoungill 1-Dong, Kangdong Gu, Seoul 134-782 (KR)

( * ) Notice: Subject to any disclaimer, the term of this patent is extended or adjusted under 35 U.S.C. 154(b) by 5 days.

(21) Appl. No.: 10/189,368

(22) Filed: Jun. 25, 2002

(65) Prior Publication Data

US 2002/0195324 A1 Dec. 26, 2002

Related U.S. Application Data

(63) Continuation-in-part of application No. 09/655,333, filed on Sep. 5, 2000, now Pat. No. 6,329,616.

(51) Int. Cl.[7] .............................................. H01L 29/00
(52) U.S. Cl. ............... 200/51.03; 200/51 R; 200/51.08; 439/188; 439/655
(58) Field of Search ...................... 191/12.4; 200/50.28, 200/51 R, 51.02–51.05, 51.09, 51.11; 307/40, 41, 141; 361/111, 115, 116; 174/48, 70, 135; 439/650–654, 954, 535, 207–211, 214, 218, 620, 622, 761, 101, 108, 52, 188, 501, 502

(56) References Cited

U.S. PATENT DOCUMENTS

| | | | | |
|---|---|---|---|---|
| 5,350,310 A | * | 9/1994 | Chen | 439/188 |
| 5,361,879 A | * | 11/1994 | Lin | 191/12.4 |
| 5,424,903 A | * | 6/1995 | Schreiber | 361/166 |
| 5,429,518 A | * | 7/1995 | Chen | 439/188 |
| 5,430,598 A | * | 7/1995 | Rodolfo et al. | 361/115 |
| 5,967,815 A | * | 10/1999 | Schlessinger et al. | 439/188 |
| 6,329,616 B1 | * | 12/2001 | Lee | 200/51.03 |
| 6,332,794 B1 | * | 12/2001 | Tzeng Jeng | 439/188 |

* cited by examiner

Primary Examiner—Michael A. Friedhofer
(74) Attorney, Agent, or Firm—G W i P S

(57) ABSTRACT

An electric outlet with a plurality of individual switches and rotatable receptacles is provided for efficiently protecting against possible electric hazard and organizing electric extension cords. The electric outlet provides three kinds of rotatable receptacles rotating on a plan plane, vertical plane or both plan and vertical plane simultaneously. The electric outlet rotating simultaneously on a plan and vertical plane comprises a disk-type receptacle and a cylindrical-type receptacle. The disk-type receptacle comprises a top disk part, lower cylindrical body part and a pair of outer stoppers. The cylindrical type receptacle comprises a hollow part for inserting a disk type receptacle, an annular rim, a pair of inner stoppers and shafts. A protecting cover as a safety device installs on top of disk part for automatically blocking the slots. The assembled disk-type and cylindrical-type receptacle is installed to the rotatable electrical outlets. The various decorative electric outlets are also provided to apply thereof.

17 Claims, 19 Drawing Sheets

ELECTRIC OUTLET WITH ROTATABLE RECEPTACLES

This patent application is a continuation-in-part of U.S. patent application Ser. No. 09/655,333, filed on Sep. 5, 2000, which is now patented U.S. Pat. No. 6,329,616 B1, Issue date; Dec. 11, 2001.

BACKGROUND OF THE INVENTION

1. Field of the Invention

The present invention relates to an electrical outlet with rotatable receptacles and individual switches. More particularly, each receptacle is capable of rotating either on a top surface, top to lateral surface or both in order to reduce potential electrical hazards while at the same time organizing electrical cords around the users' area. The various decorative electrical outlets being able to hang on a wall are also provided to apply thereof.

2. Description of Related Art

Generally, a power outlet installed on the wall of a house is used to plug in household electric appliances, electronic devices or personal computers. Since most standard wall-type power outlets provide one or two receptacles in one place, only one or two electronic devices can be plugged in at one place.

Often, the number of appliances or electronic devices one needs to plug in exceeds the number of receptacles on the wall-type electric outlet or the wall outlet is located far from the electronic devices. In this situation, if one needs to plug in more than two electronic devices such as a personal computer with its peripheral equipment, an extra electrical outlet with multiple receptacles is required.

As shown in FIG. 1, a typical conventional electric outlet comprises a plug 10 with cord, a plurality of the receptacles 20 and an on-off switch 30. When the plug 10 is plugged into a wall outlet and switched on, the power is supplied to the receptacles 20 and ready to use the electrical appliances.

At this point, if a specific appliance were not in use while it is being plugged-in the electric outlet, the power would be continuously supplied to the electric appliance. Thus, the power is wasted, and causes to generate the harmful electrical waves and malfunction the electric appliance.

Additionally, when all receptacles in the outlet are plugged in the electric appliances, and one appliance which is not in use needs to turn off the power while other electric devices are in-use, the electric appliance which is not in use must be unplugged by pulling out the plug from the corresponding receptacle.

At this moment, when the switch 30 is turned off, all electric appliances which are plugged in the electric outlet are cut off the electric power supply. Therefore, all appliances plugged in the same outlet are losing the electric power. Reversibly, when the switch 30 is turned on, the electric power is supplied to all of the electric appliances which are plugged in the outlet. Therefore, the separated switches are necessary to independently control the individual electric appliances plugged in the same outlet.

Regarding safety, it is necessary to provide a safety device, which could prevent possible electric hazard. If an unwatched child is playing in the vicinity of the electric outlet with a foreign object such as a nail, hairpin, clip or metal piece, the child will be exposed to potential electric hazard. To avoid such a potential danger, the present invention provides various types of safety devices.

Since most on-off switches are externally exposed, there are great possibilities for the switches to be operated unintentionally. For example, if one were accidentally stepped on or inadvertently pushed down the switch by elbow, the electric power would be instantly turned off caused possibly a trouble. If this were occurred during computer operation, the operator could accidentally lost his work. Therefore, a lid for the electric outlet as a protective device is provided in the present invention.

Another safety device is also provided for protecting the user from possible electrical hazard and organizing the electric cords around the users' area by introducing an electrical outlet with rotatable receptacles. Each of the receptacles is capable of rotating either on a top surface, top to lateral surface or both, at the same time.

Presently, the conventional electric outlets have long rectangular shape of simple design with simple function such as a main switch. Such a simple design of receptacles may not be attractive to the user or potential buyer. If one sees a dusty electric outlet in a corner of the room, one would find it objectionable.

Now, the concepts are changed and many people want to observe pleasantness even in such a trivial object. If one sees a well-decorated, colorful and attractive electric outlet on the wall or in the corner of the room instead of a dusty and boring shaped outlet, one may feel pleasantness monetarily.

Therefore, the receptacles are applied to the fancy and cute shapes of electric outlets. The various shapes of electrical outlets are colorfully decorated and artfully shaped in the form of animals such as turtles, squid, shells, dolphins, tigers, mice, fish. The outlets are also designed with shapes of insects such as beetles and ladybugs. There are also available in flower shapes such as a sunflower, daisy as well as in other shapes such as a hamburger, egg, milk bottle, beer can or automobile.

The fancy and stylish electrical outlets are capable of being hung on the wall for decoration and the extended cords are long enough to reach the appliances. The decorative electric outlets also could provide a lid or cover for the safety concerns.

SUMMARY OF THE INVENTION

In order to achieve the objectives of the present invention, an electrical outlet is equipped with rotatable receptacles. The electric outlet is formed with a top cover, base cover, electric cord, reset and a set of circuitry for supplying electric power comprised of: a plurality of individual switches for turning electric power on and off to corresponding individual receptacles. A plurality of receptacles (11) is installed in the circuitry of the power supply. Each receptacle has the capability of being individually rotated at its top surface (on a plan plane). The rotation of each receptacle is limited to less than one revolution so as to prevent the external extension cord or internal electric connections from twisting and becoming entangled with one another.

Another type of electrical outlet with rotatable receptacles is comprised of a plurality of receptacles (21) installed in the circuitry of the power supply, with each receptacle capable of being individually rotated from top to lateral surfaces, and the rotation of each receptacle being limited to less than one revolution on a vertical plane with respect to a rotating axis for preventing the twisting, bending or breaking of the external extension cords or internal electric connections.

Another type of electrical outlet with rotatable receptacles is comprised of a plurality of receptacles formed by the assembly of the disk-type receptacles (11) and cylindrical type receptacles (31) installed in the circuitry of the power supply. Each disk-type receptacle (11) can be individually rotated at its top surface (or on a plan plane). Each cylindrical-type receptacle (31) is capable of being individually rotated at a vertical plane with respect to a rotating axis between a top surface and lateral surface. Both the rotation of disk-type receptacles (11) and cylindrical-type receptacles (31) are limited to less than one revolution for the purpose of preventing the twisting of external extension cords or internal electric connections.

A disk-type receptacle is comprised of a top disk part (51), a lower cylindrical body part (52) with a certain length, a flat seating area (56) and a pair of outer stoppers (53) disposed at opposite ends each other. The disk-type receptacle has the standard dimensions. An outer diameter of the top disk part (51) is larger than that of the lower cylindrical body part (52) in order to provide a flat seating area (56). The flat seating area (56) is abutted at a right angle between the top disk part (51) and lower body part (52).

A cylindrical-type receptacle is comprised of a hollow part (61) for inserting the disk-type receptacle (11), an annular rim (62) to mount the flat seating area (56) of the disk-type receptacle, a pair of inner stoppers (63) and a pair of shafts (64) disposed at both lateral sides. The shafts (64) have more than two notches (65) for retaining the cylindrical type receptacle at a proper position. A retaining device (66) is elastically pushed to retain the cylindrical type receptacle at a certain position between top to lateral surfaces by engaging one of the notches (65).

A safety device is installed on top of the disk type receptacle for automatically blocking a pair of prong slots when there are no devices plugged into the outlet. A cover will slide along the grooves by pushing force when a plug is plugged in. The cover will automatically block a pair of prong slots by resilient force for preventing a possible electrical hazard when a plug is pulled out.

An application of the rotatable receptacles is also provided for decoration. The decorative electrical outlets can be hung on a wall and have a either one shape of animals, turtle, squid, shell, dolphin tiger, mouse, fish, insect, beetle, ladybug, flowers, sunflower, daisy, hamburger, egg, milk bottle, automobile or beer can.

BRIEF DESCRIPTION OF THE DRAWINGS

FIG. 25 through FIG. 35 are the various decorative electrical outlets with rotatable receptacles and individual switches, which are applied to either embodiment of the present invention.

FIG. 25 is a compact electrical outlet applied to the rotatable receptacles and extended female cord.

FIG. 26 is a decorative electrical outlet with a compact box shape with extended female cord.

FIG. 27 is a decorative electrical outlet with an oval or mouse shape with extended female cord.

FIG. 28 is a decorative electrical outlet in a heart shape with extended female cord.

FIG. 29 is a decorative electrical outlet in a daisy shape with extended female cord.

FIG. 30 is a decorative electrical outlet in a sunflower shape with extended female cord.

FIG. 31 is a decorative electrical outlet in a banana shape with extended female cord.

FIG. 32 is a decorative electrical outlet in a fish shape with extended female cord.

FIG. 33 is a decorative electrical outlet in a hamburger shape with extended cord.

FIG. 35 is a decorative electrical outlet in a turtle shape with extended female cord.

DETAILED DESCRIPTION OF THE PREFFERED EMBODIMENT

The embodiments of the present invention will be explained in detail accompanying with FIGS. 2 through 35.

Figure 1:
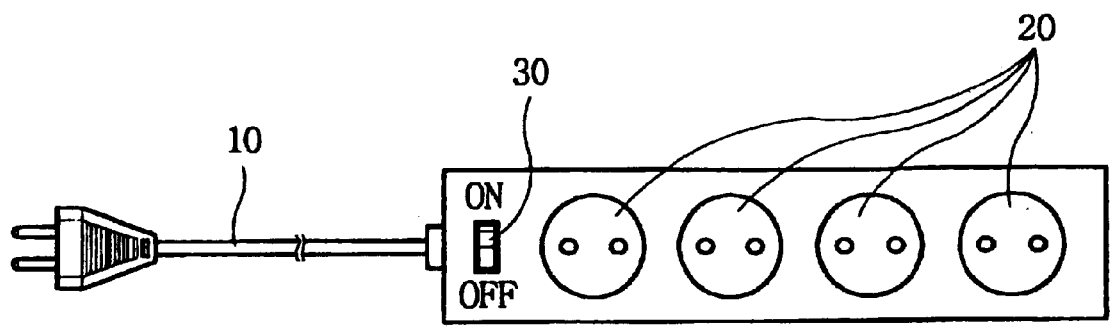
FIG. 1 is a plan view illustrating a conventional power control apparatus.
Figure 2:
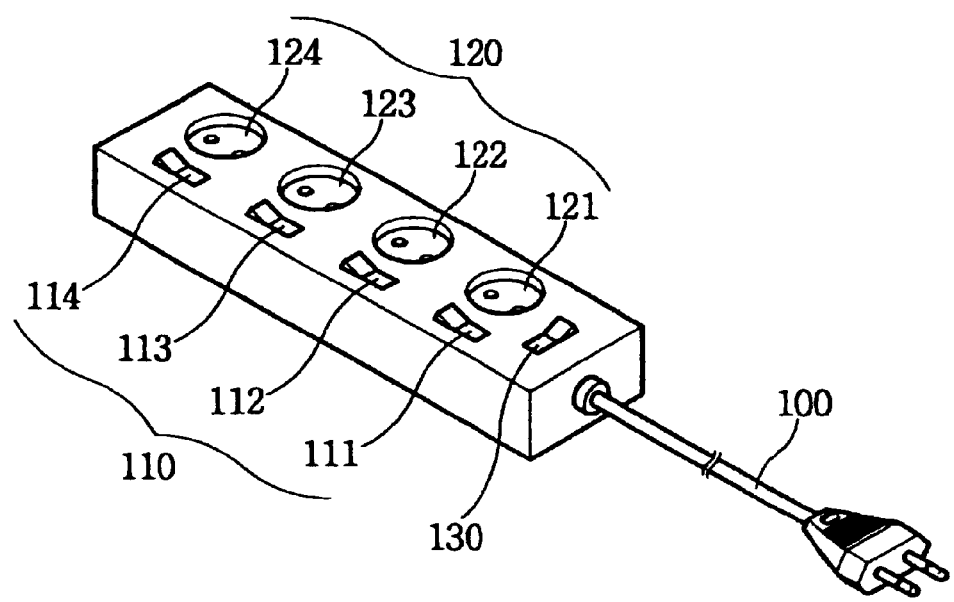
FIG. 2 is a perspective view illustrating the outer appearance of a power control apparatus according to a first embodiment of the present invention.
Figure 3:
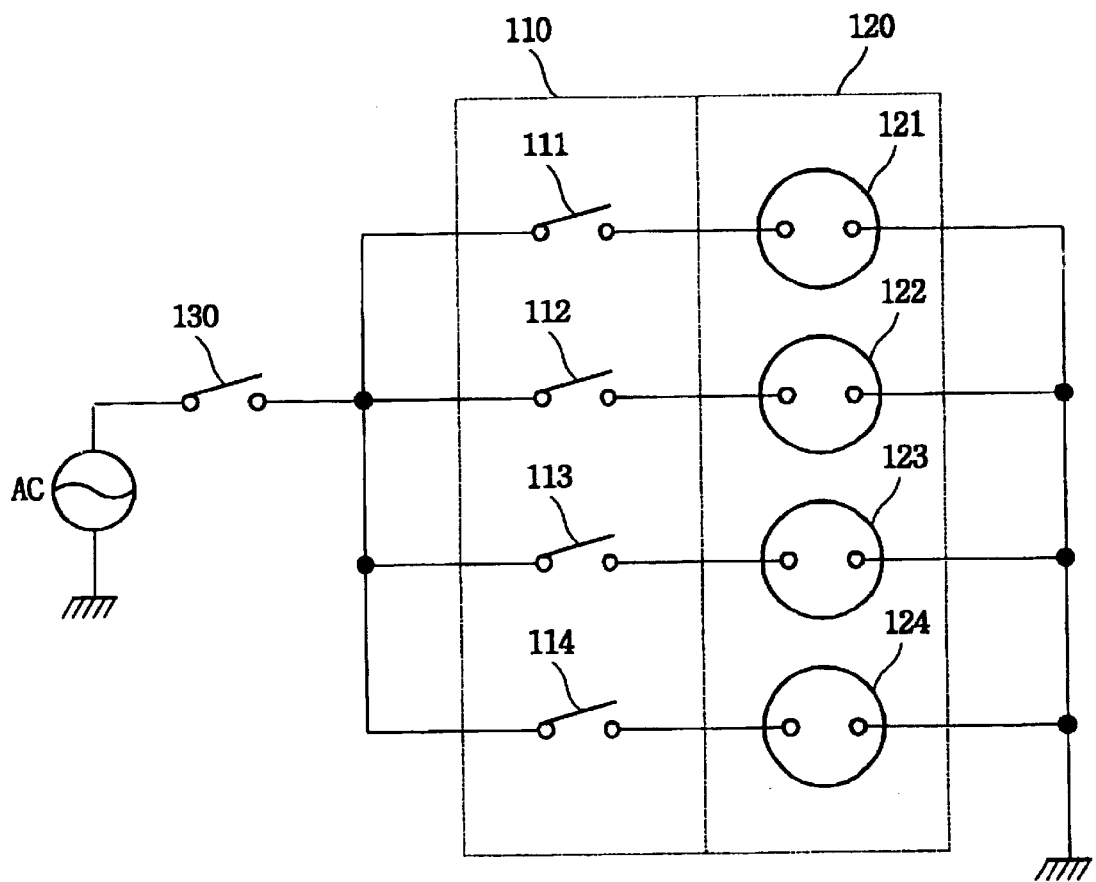
FIG. 3 is a schematic view illustrating an inner circuit construction according to the present invention.

The first embodiment of the present invention as shown in FIGS. 2 and 3 will be explained as follows. FIG. 2 is a schematic view illustrating an outer feature of the first embodiment of the present invention. A switch unit 110 comprised of a plurality of individual switches 111~114 is installed to a corresponding receptacle 121~124 of the receptacle unit 120.

When a plug disposed at the end of the cord 100 is plugged into a wall outlet, the electric power is supplied to a receptacle of the receptacle unit 120 which a corresponded switch of the switch unit 110 is turned on.

As shown in FIG. 3, one end of switch terminals 111, 112,113 114 of the switch unit 110 is connected in parallel to AC power. The other switch terminals 111, 112, 113 114 is connected to the receptacles 121, 122, 123 124 of the receptacle unit 120 in series, and the other end of the receptacles 121, 122, 123 124 is grounded (negative terminal).

When a user turns on a switch 111 of the switch unit 110, the electric power is independently supplied to the receptacle 121 of the receptacle unit 120. At this moment, if the receptacles 122, 123 and 124 are not in use, the corresponded switches 112,113 and 114 respectively are not needed to turn on the electric power, thereby making it possible to save energy. If the user turns on the corresponded switch to the receptacle, which is plugged in an electric appliance, the AC power is supplied to the receptacle, so that the electric appliance is ready to use. Therefore, it is possible to turn on and off a switch independently for controlling the AC power supply to the corresponding receptacle.

Furthermore, a main switch 130 is provided to control the entire receptacles 121~124 at one operation. The main switch 130 is installed in series between the AC power source and the switch unit 110. Even though the user leaves the switches 111, 112, 113 and 114 of the switch unit 110 turned on, the power supply is able to cut off the receptacle unit 120 by turning off the main switch 130.

For example, if electric appliances are plugged in all of the receptacles 121, 122, 123 and 124, the corresponding switches 111, 112, 113 and 114 of the switch unit 110 are selectively and independently turned on and off depending on the necessity of operating the electric appliances. If all of the electric appliances are not in use, the main switch 130 is turned off to cut off electric supply to receptacles 121, 122, 123 and 124. Therefore, it is possible to integrally control the system.

The main switch 130 and individual switches 111, 112, 113 and 114 of the switch unit 110 are connected to the corresponding receptacle to effectively control the electric power current and to ground the terminals.

Figure 4:
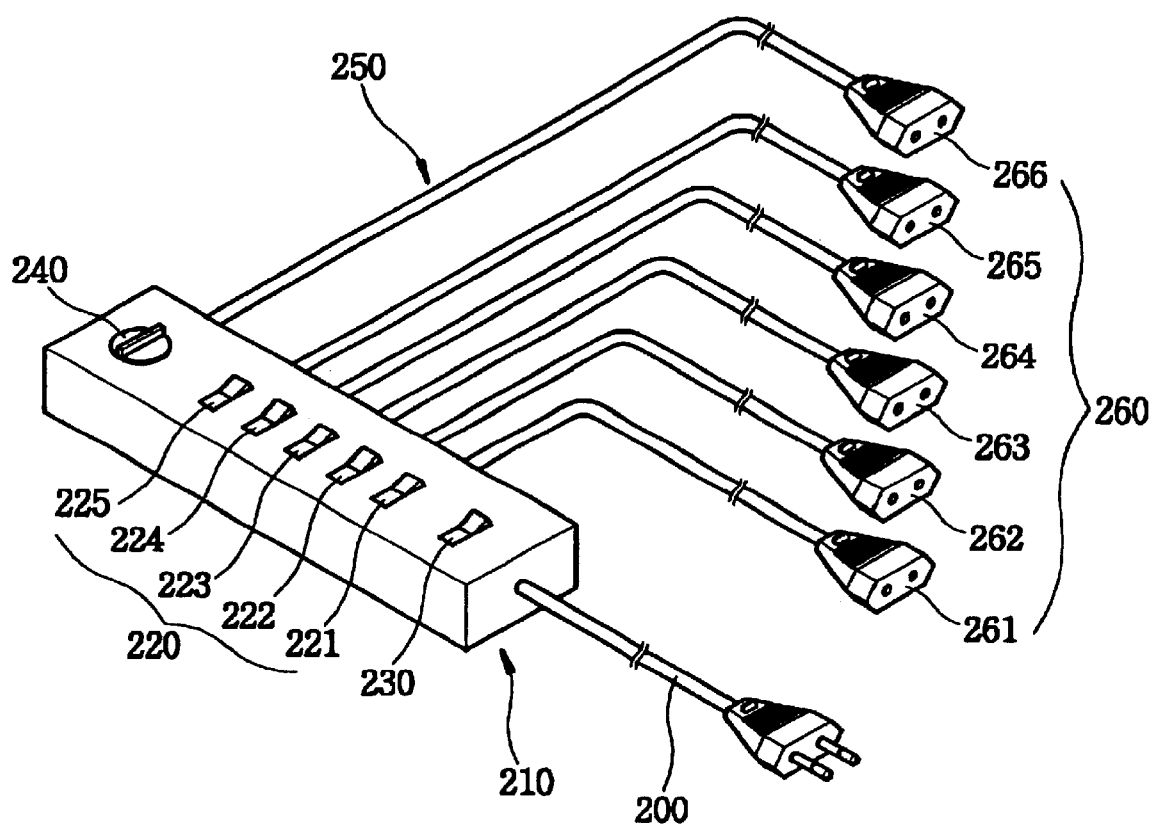
FIG. 4 is a perspective view illustrating a power control apparatus according to a second embodiment of the present invention.

The second embodiment of the present invention will be explained with reference to FIG. 4 and FIG. 5. FIG. 4 is a schematic drawing illustrating the power-control apparatus. As shown in the drawing, a switch box 210 is integrally formed a plurality of individual switches 221~225 in a switch unit 220 for separately supplying the power from the power source to a remote plug unit 260. Remote plug unit 260 is formed by a plurality of individual remote plugs 261~266 which each connect to extension cord 250. A main switch 230 is provided between the power supply cord 200 and the individual switches 221~225 of the switch unit 220. A timer 240 for setting operation time is connected to a remote plug 266 separately from switch unit 220.

Main switch 230 of switch box 210 allows individual control of switches 221~225 and of remote plug unit 260.

The switches described above are paired with the remote plugs. Main switch 230 and switch unit 220 are formed by a bi-polar switch capable of connecting and disconnecting the positive and negative poles. Main switch 230 and switch unit 220 may also be formed by a uni-polar switch capable of connecting and disconnecting one of the positive and negative poles. Extension cord 250 is long enough to connect the remotely located electric appliances.

Figure 5:
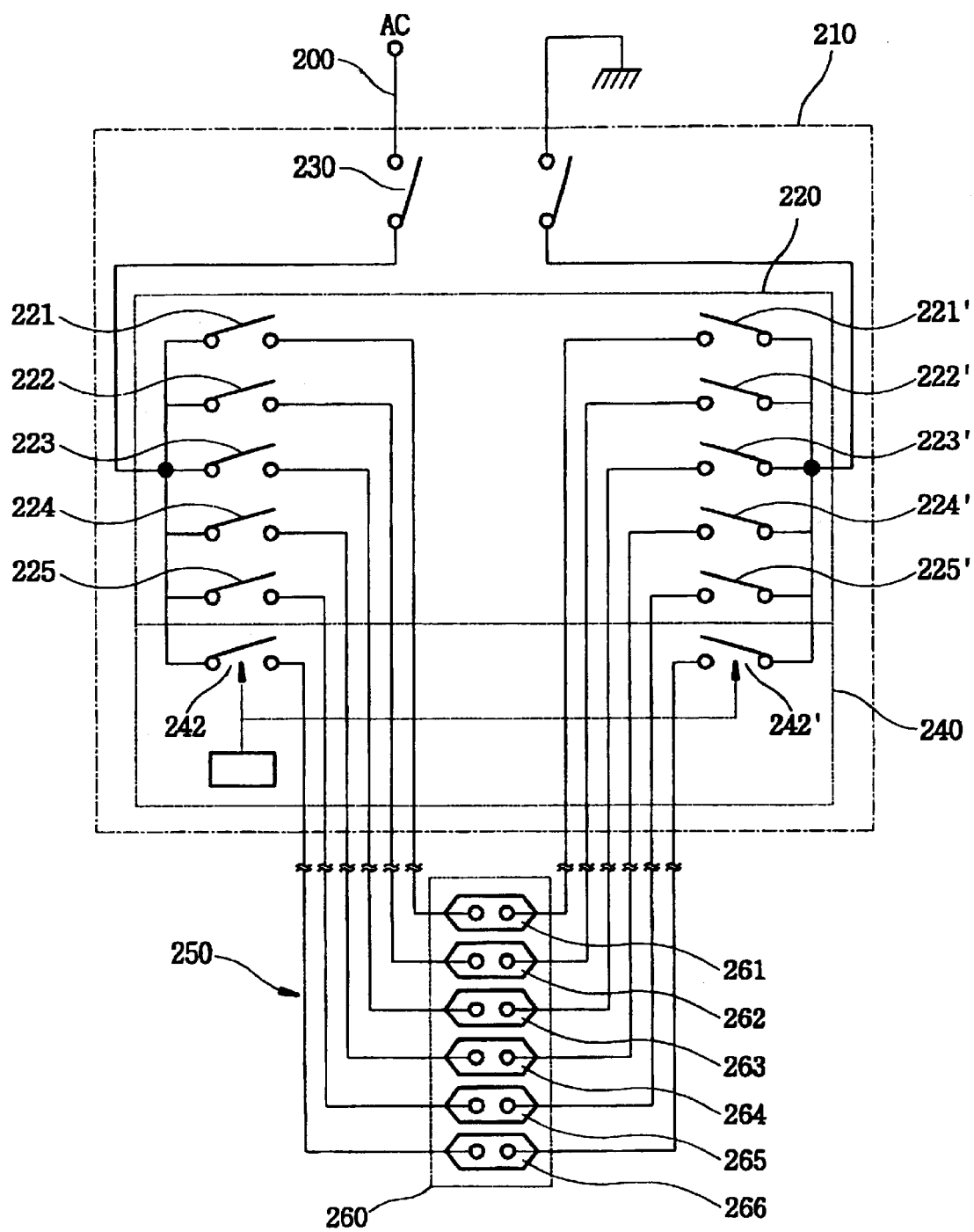
FIG. 5 is a schematic circuit diagram according to the present invention.

FIG. 5 is illustrates the circuitry of the power control apparatus for the present invention. As shown in the drawing, one terminal of main switch 230 in switch box 210 is connected to an AC power source in series. The other terminal end of main switch 230 is connected parallel to each terminal of switches 221, 222, 223, 224, 225 of switch unit 220 in switch box 210. The other terminal end of switches 221, 222, 223, 224, 225 is connected in series to a terminal of individual remote plugs 261, 262, 263, 264, 265 of the plug unit 260, and the other end of each of the remote plugs is grounded through extension cord 250.

The other terminal of remote plugs 261, 262, 263, 264, 265 are connected to the corresponding negative switches 221', 222', 223', 224', 225', and the negative switches are connected to the negative main switch 230 and the negative power.

The following explains the operating principles. The user places a switch box 210 on the desk. Remote plug units 260 and extension cords 250 are placed underneath the desk. For example, a switch unit 221/221' enables independent turning on of electric power to a corresponding remote plug 261 plugged into an electric appliance through extension cord 250. Simultaneously, if electric appliances are plugged into remote plugs 262, 263, 264, or 265, the corresponding switches 222, 223, 224, 225 and 222', 223', 224', 225' are selectively and independently operated to supply electric power, so that electric power is conserved and the discharge of harmful electrical waves is reduced.

Along with main switch 230 and the individual switches in switch unit 220, a timer switch 240 could be provided for setting the operating time corresponding to when a specific appliance is in use. When the operating time set by the timer switch 240 has elapsed, switches 242 and 242' are automatically turned off so that the power supply is disconnected through extension cord 250 to remote plug 266.

An application of the power control apparatus excluding a timer switch 240 is described in detail accompanying FIGS. 25 through 35. It is possible to replace a long rectangular shaped switch box 210 with a decorative and whimsically shaped switch box as shown in FIGS. 25 through 35. The various colorfully decorative switch boxes could have the shape of an animal such as a turtle, squid, shell, dolphin, tiger, mouse, or fish; and insect shapes like beetles, and ladybugs or a flower shape such as a sunflower or a daisy and other shapes such as a hamburger, an egg, milk bottle or a can of beer, or an automobile, etc., are provided.

Figure 6:
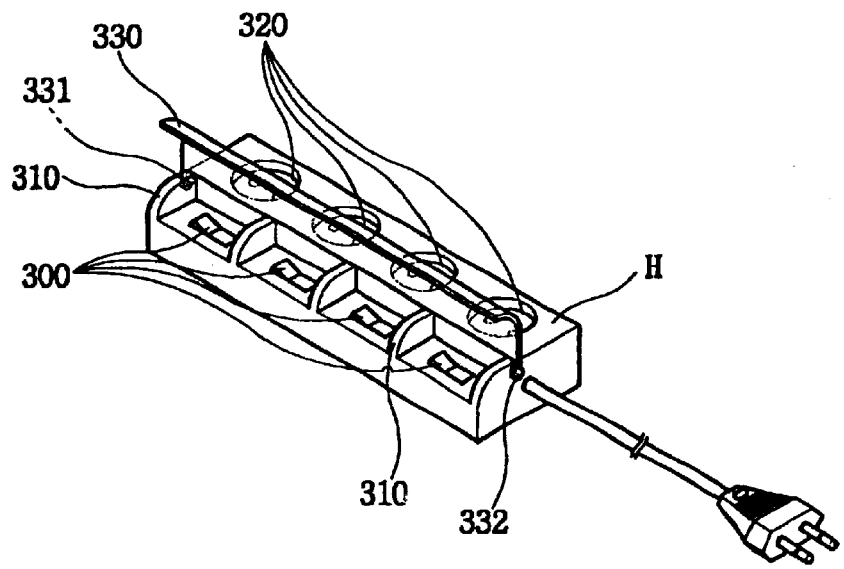
FIG. 6 is a perspective view illustrating a power control apparatus according to a third embodiment of the present invention.

FIG. 6 illustrates a third embodiment of the present invention. In this embodiment of the present invention, the power control apparatus includes a plurality of switches 300 for connecting or disconnecting the power to receptacle 320. Switches 300 are separated from each other by a barrier formed between the neighboring switches.

As shown in FIG. 6, a number of switches 300 are installed along the side of one edge at a lower surface than the top surface of housing H where receptacles 320 are located. Each switch 300 is separately installed in a compartment of housing H with a common lid 330. It is possible that this feature will prevent accidental operation of the switch by the turning on or off of a wrong switch. Because barrier wall 310, consisting of a compartment and lid, covers each switch 300 individually, it is possible to prevent erroneous operation of switch 300. For example, a user may step on or press down the switch unintentionally by his body or drop an object on the switch accidentally, thus causing an interruption of the electric power supply to the appliance in use. But, a lid or cover 330 is hinged at an upper part or lateral part of the housing H by hinges 331, 332 with the purpose of protecting switches 300.

Figure 7:
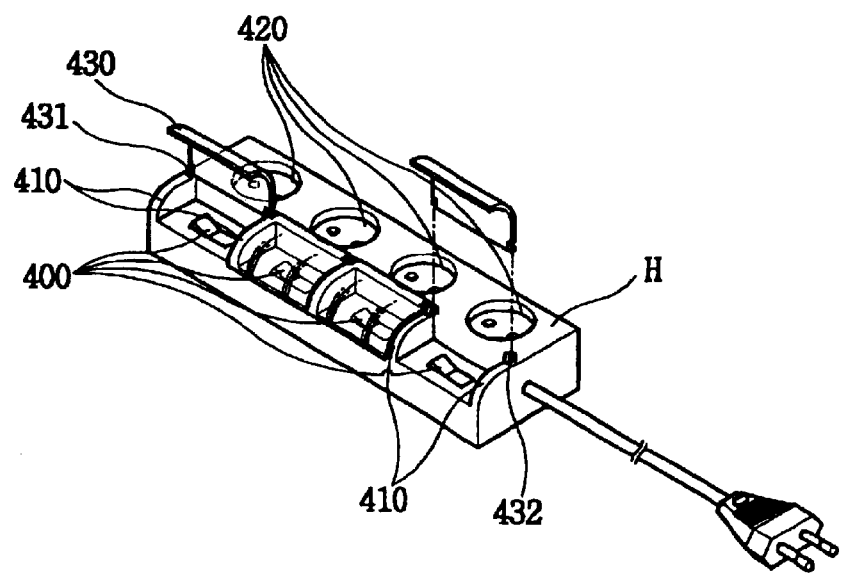
FIG. 7 is a perspective view illustrating an example of the third embodiment of the present invention.

FIG. 7 is another example of the third embodiment of the present invention. In this embodiment, each switch 400 is covered by an individual lid or cover 430. Each switch 400 in each compartment has its own lid or cover 430. The cover 430 is hinged at the upper part of each barrier wall 410 by using hinges 431, 432.

Figure 8:
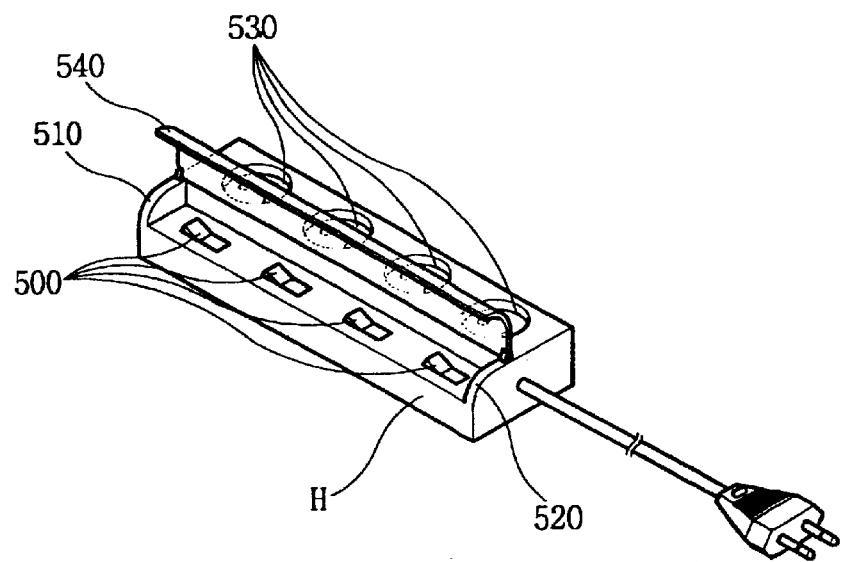
FIG. 8 is a perspective view illustrating another example of the third embodiment of the present invention.

FIG. 8 is another example of the third embodiment of the present invention. In this example, there is no individual compartment for each switch 500. The barrier wall 510 is formed at both ends of the housing so that a common lid 540 is hinged at the upper corner of the housing for protecting the switches 500.

Figure 9:
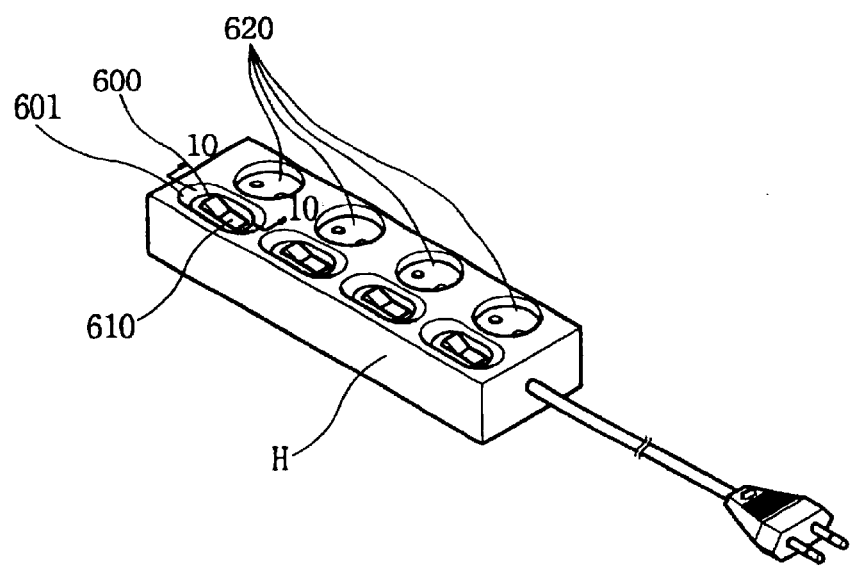
FIG. 9 is a perspective view illustrating a power control apparatus according to a fourth embodiment of the present invention.

The fourth embodiment of the present invention is shown in FIG. 9. As shown, the power control apparatus includes a plurality of switches 610 for connecting or disconnecting the electric power to a plurality of receptacles 620. The switches 610 are installed at a concaved area 600 lower than the top surface of housing H. There is a slanted surface between the concaved area 600 and the top surface of the housing. Concave area 600 is formed for installing switches 610, and switches 610 are installed to correspond with receptacle 620. Further, the depth of concave area 600 is the same as the height of switches 610 or slightly deeper than the heights of switches 610.

Figure 10:
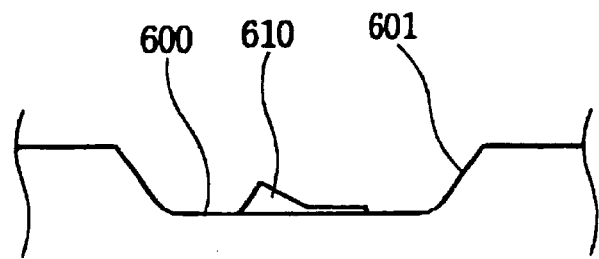
FIG. 10 is a cross sectional view taken along line 10—10 of FIG. 9.

FIG. 10 is a cross section view taken along the line A—A of FIG. 9. As shown, switch 610 is installed at concave area 600 formed on the top surface of housing H. The abutted area between concave area 600 and the top surface of housing H has slanted 601 at the opposite end. The slanted part 601 is for the comfort of the operator's finger and ease in pressing switch 610 located in concave area 600.

Figure 11:
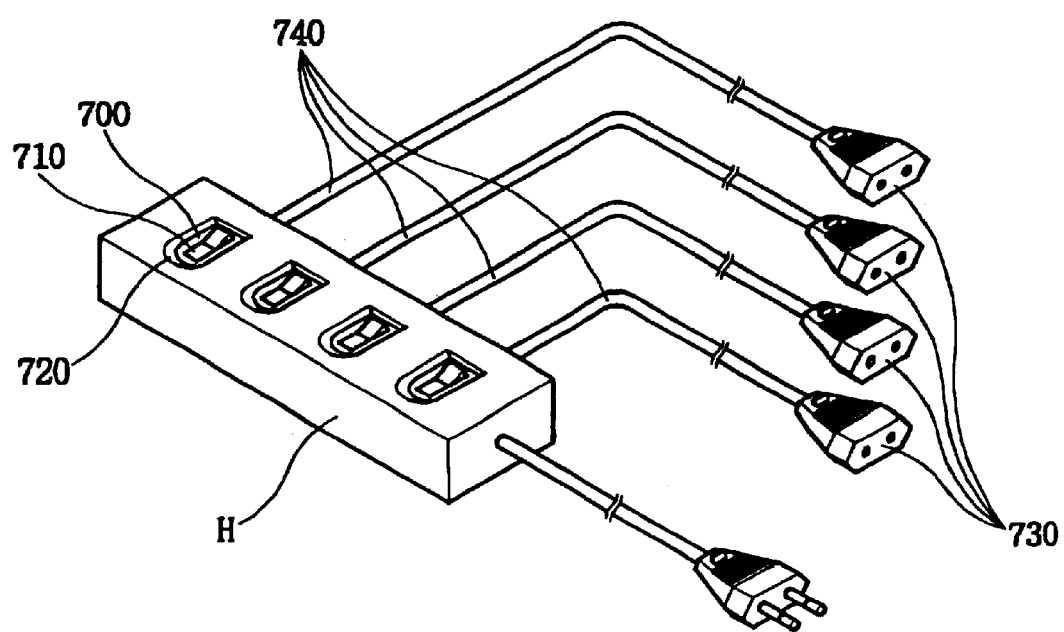
FIG. 11 is a perspective view illustrating an example of the fourth embodiment of the present invention.

FIG. 11 is another example of the fourth embodiment of the present invention. The power control apparatus includes a switch box H having a plurality of switches 710, and a plurality of remote plugs 730 uniformly spaced in regular intervals by extension cords 740 from switch box H. Each switch 710 is installed in the concave area 700. Both ends of concave area 700 are slanted for easy operation of switch 710.

Figure 12:
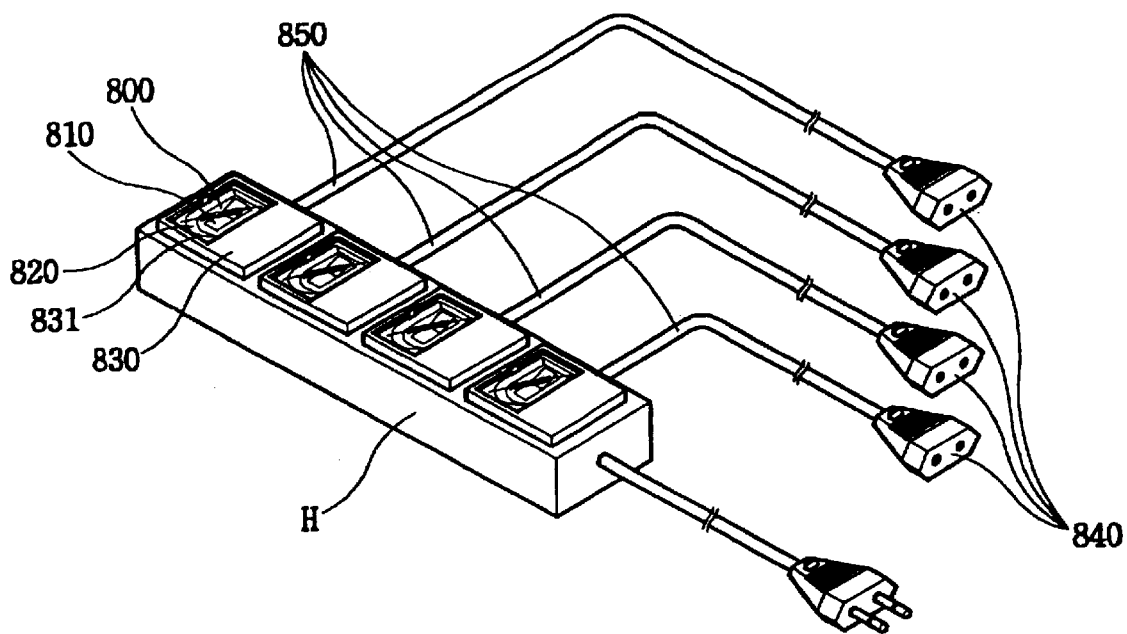
FIG. 12 is a perspective view illustrating another example of the fourth embodiment of the present invention.

FIG. 12 is another example of the third embodiment of the present invention. As shown, a sliding cover 820 is installed on the individual switch 810 being installed at the concave area 800 in order to prevent any accidental switching. The sliding cover 820 slides along the guiding grooves 831 leftward to the resting part 830. The resting part 830 and the guiding grooves 831 must not protrude greatly from the top surface of housing H.

Figure 13:
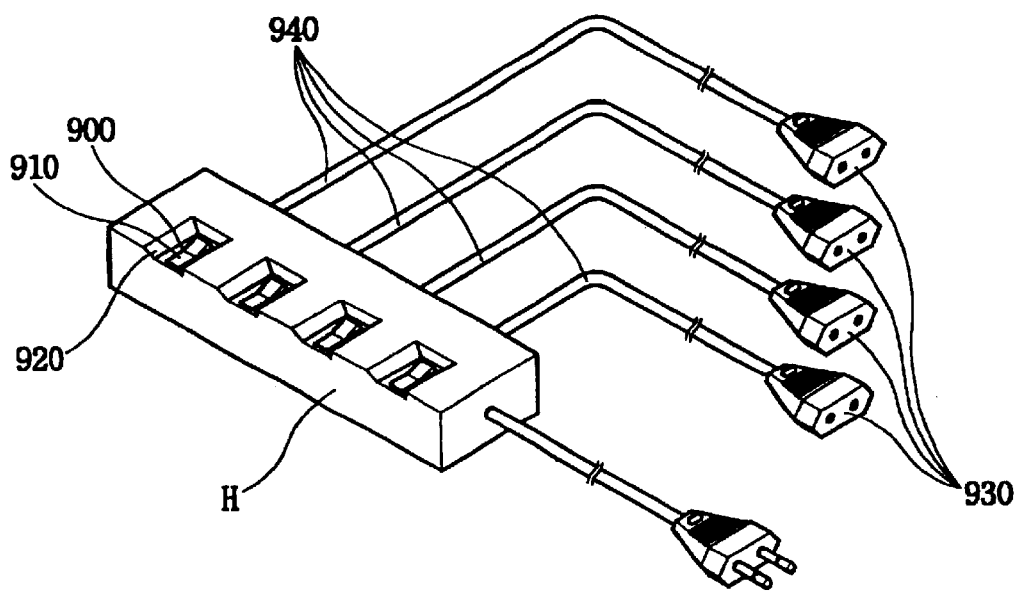
FIG. 13 is a perspective view illustrating another example of the fourth embodiment of the present invention.

FIG. 13 is yet another example of the fourth embodiment of the present invention. The power control apparatus includes a switch box H having a plurality of individual switches 910 and remote plugs 930 with extension cords 940 arranged in regular intervals. The switches 910 are installed at the concave area 900 having a certain depth with an opened front end along the edge of switch box H. Each concave area 900 has a certain depth deeper than the height of switch 910. Both lateral surfaces of concave area 900 are slanted, so that an operator's finger can easily push the switches 910.

Hereinafter, the electric outlets with rotatable receptacles are described in detail accompanying with FIGS. 14 through 24a and 24b.

Figure 14:
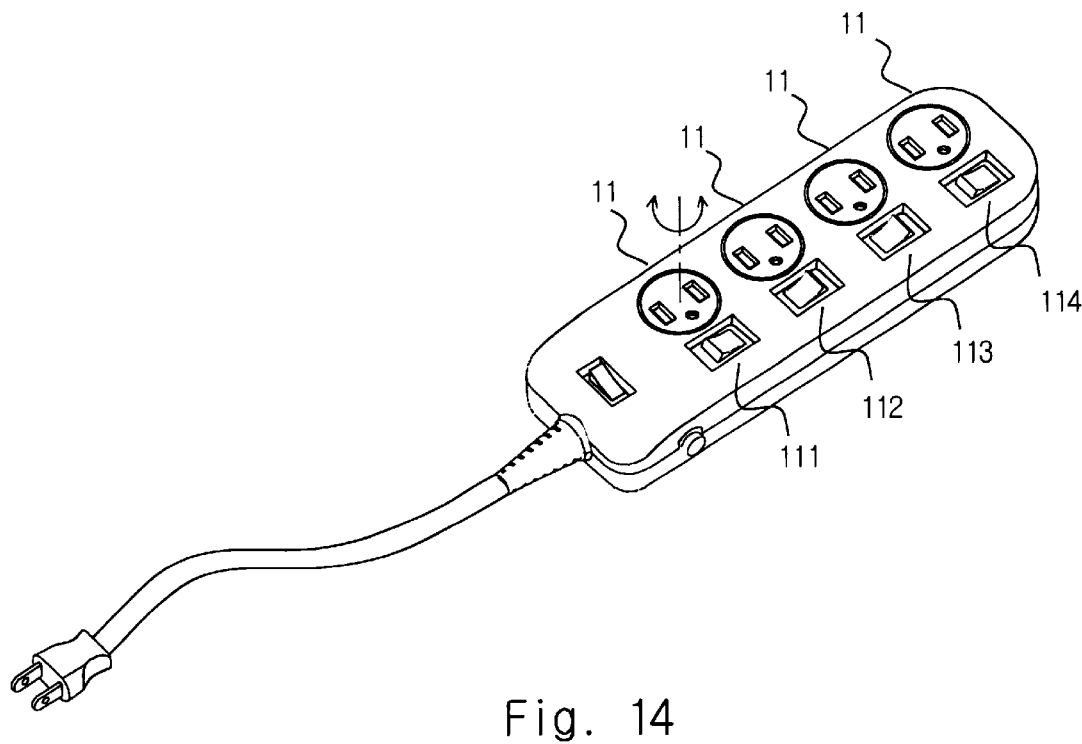
FIG. 14 is the fifth embodiment of the present invention illustrating an electrical outlet with individual switch and multiple receptacles rotatable on the top surface
Figure 18:
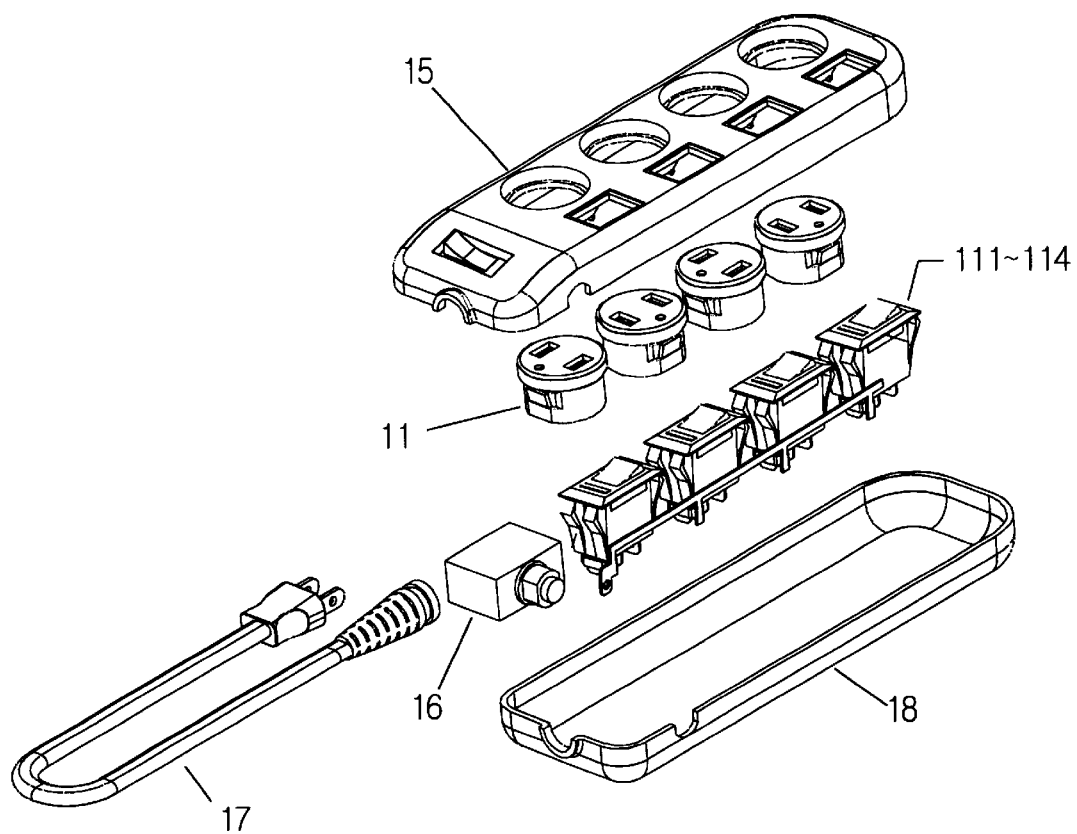
FIG. 18 is an exploded perspective view of the fifth embodiment of the present invention.

As shown in FIGS. 14 and 18, an electrical outlet with rotatable receptacles of the fifth embodiment of the present invention is provided with a plurality of individual switches. The electrical outlet comprises a top cover (15), reset (16), electric cord (17), base cover (18), a set of circuitry for supplying electric power, a plurality of individual switches (111~114), electrical prongs and receptacles (11) being rotated on the top surface or the outlet. Each receptacle enables rotating on top surface (or a plan plane) as shown in FIG. 14. However, the rotation is limited within 90° to prevent twisting of the inside or outside electric cords.

Figure 15:
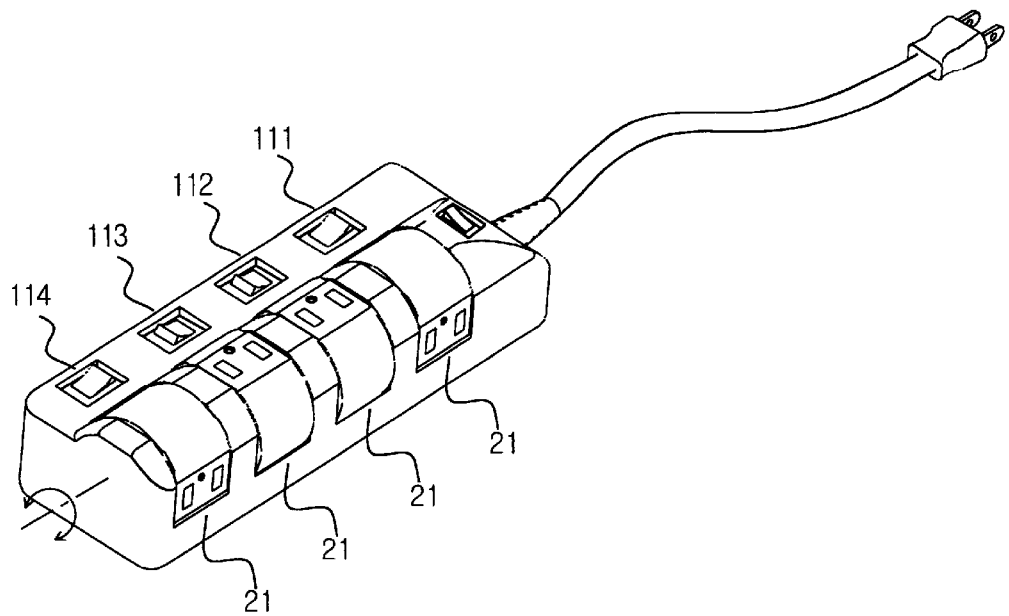
FIG. 15 is the sixth embodiment of the present invention illustrating an electrical outlet with individual switch and multiple receptacles that are rotatable from the top to lateral surfaces.
Figure 19:
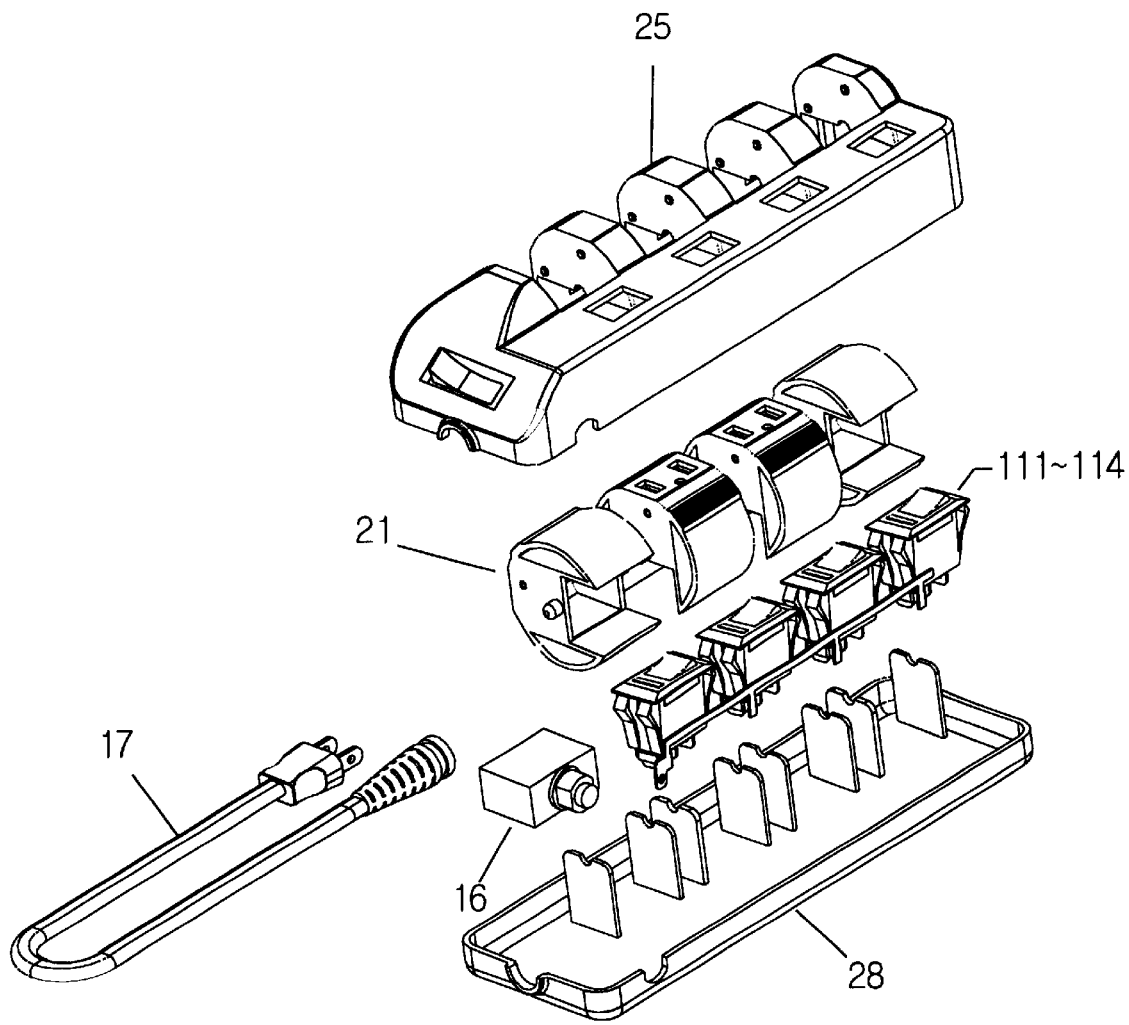
FIG. 19 is an exploded perspective view of the sixth embodiment of the present invention.

As shown in FIGS. 15 and 19, an electrical outlet with rotatable receptacles of the sixth embodiment of the present invention is provided with a plurality of individual switches. The electrical outlet comprises a top cover (25), reset (16), electric cord (17), base cover (28), a set of circuitry for supplying electric power, a plurality of individual switches (111~114), electrical prongs and receptacles (21) being rotated from the top to lateral surfaces. Each receptacle enables rotating from the top to lateral surfaces as shown in FIG. 15. The rotation is limited within 90° on a vertical plane with respect to a rotating axis for preventing twisting, bending or severing of the inside or outside electric cords.

Figure 16:
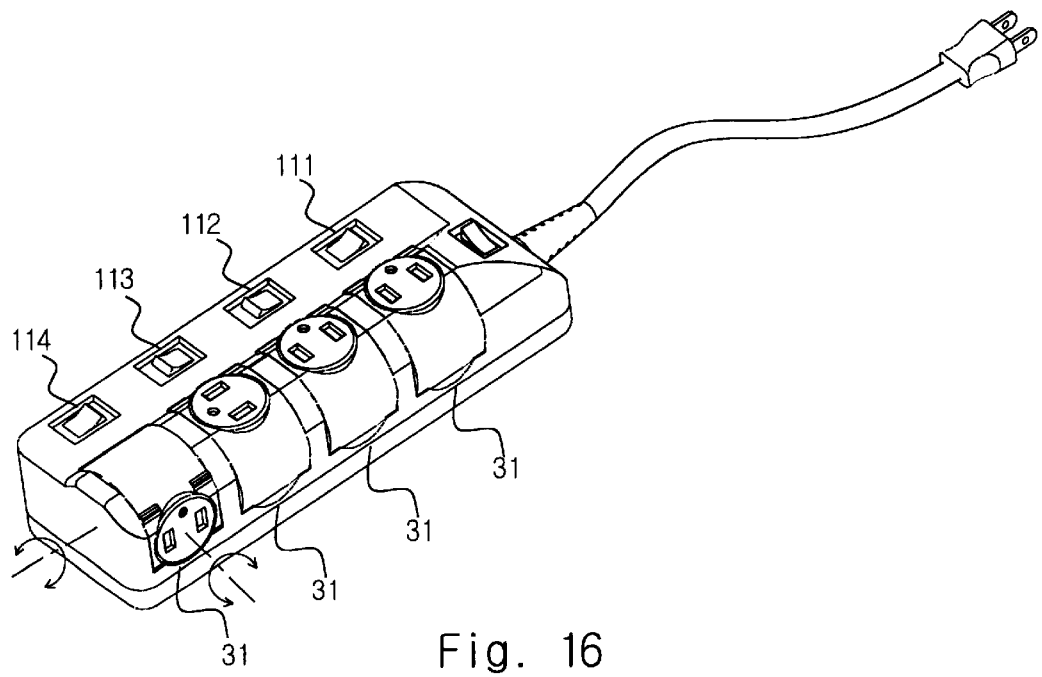
FIG. 16 is the seventh embodiment of the present invention illustrating an electrical outlet with individual switch and multiple receptacles being rotatable both on top surface and top to lateral surfaces.
Figure 20:
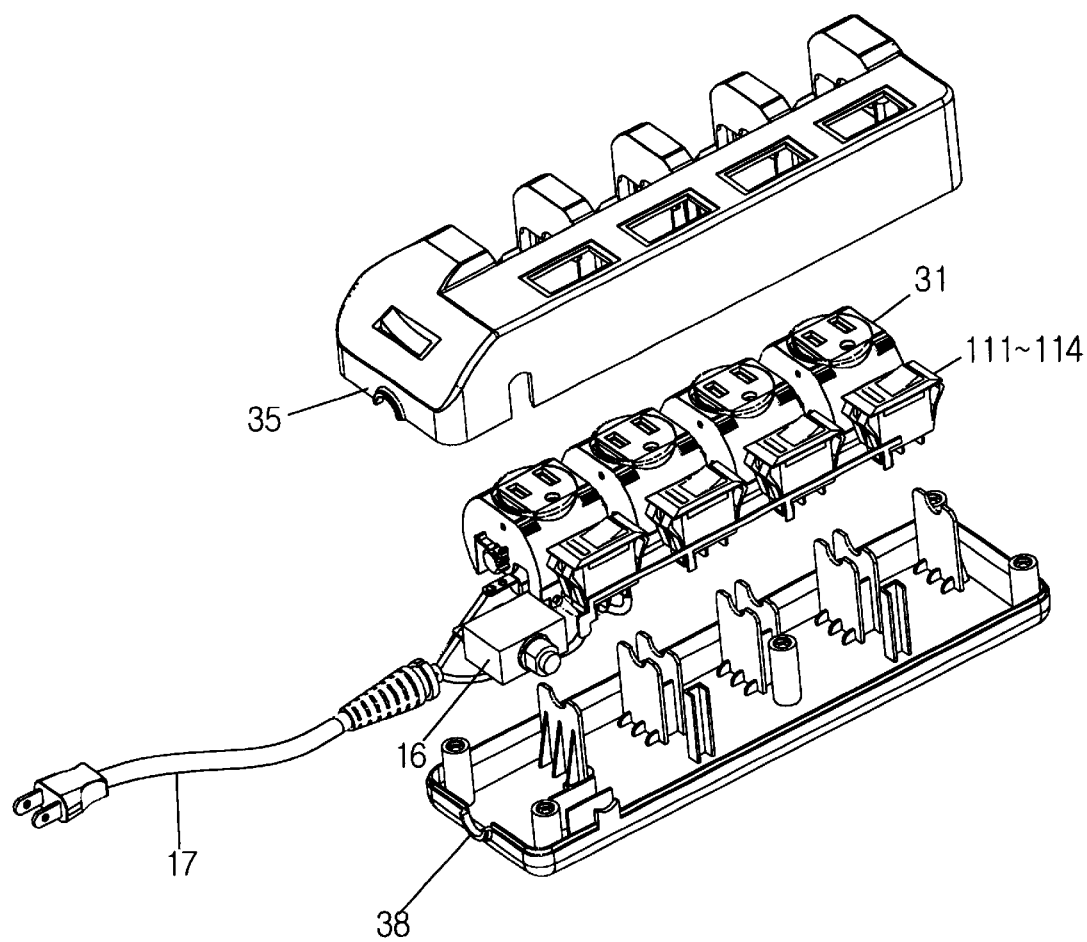
FIG. 20 is an exploded perspective view of the seventh embodiment of the present invention.

In FIGS. 16 and 20, an electrical outlet with rotatable receptacles of the seventh embodiment of the present invention is provided with a plurality of individual switches. The electrical outlet comprises a top cover (35), reset (16), electric cord (17), base cover (38), a set of circuitry for supplying electric power, a plurality of individual switches (111~114), electrical prongs and receptacles (31) being rotated both on a plan plane (or on a top surface) and vertical plane (or from the top to lateral surfaces). Each receptacle enables rotating both on the top surface (plan plane) and from the top to lateral surfaces (vertical plane) as shown in FIG. 16. The rotation is also limited within 90° at the top surface and 90° on the vertical plane against a rotating axis to prevent twisting, bending or breaking of the electric cords.

Figure 17:
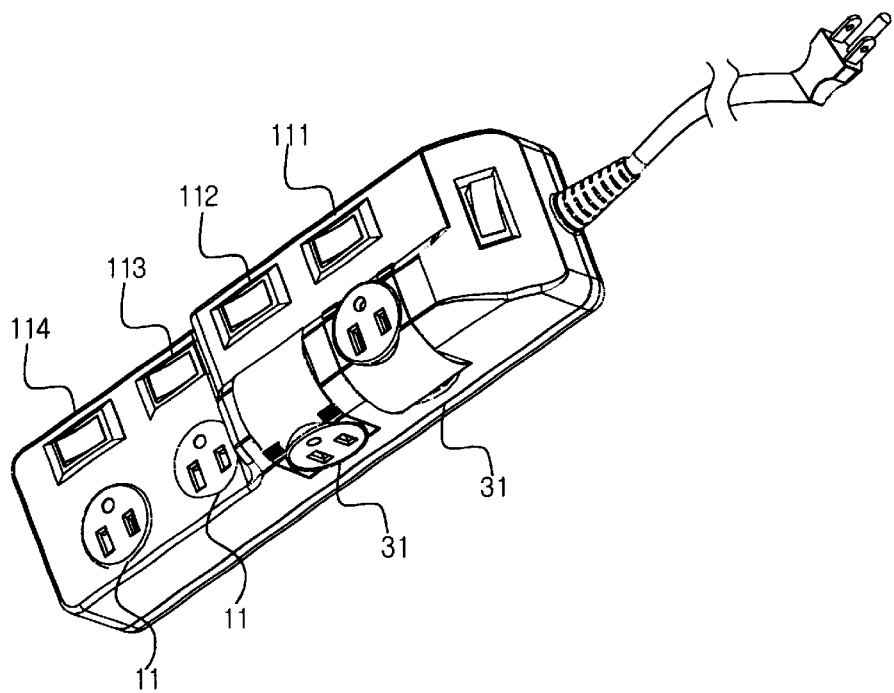
FIG. 17 is the eighth embodiment of the present invention illustrating an electrical outlet with individual switch and combination of multiple receptacles being rotatable on top surface and both on top surface and top to lateral surfaces.

As shown in FIG. 17, an electrical outlet of the eighth embodiment of the present invention is provided with a set of circuitry for supplying electric power, a plurality of individual switches and combined receptacles enabling to rotate on a top surface and both on a top surface and top to lateral surfaces. The rotation is also limited within 90° at the top surface and 90° on the vertical plane against a rotating axis to prevent twisting, bending or breaking of the electric cords.

Figure 21A:
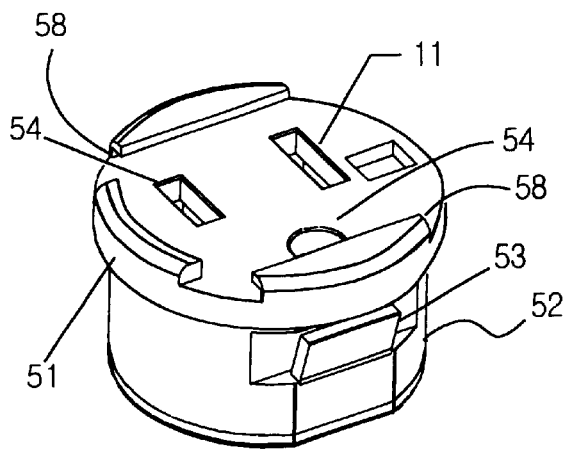
FIG. 21a is a disk-type receptacle installed on the rotatable electrical outlets of the fifth, seventh or eighth embodiment of the present invention.
Figure 21B:
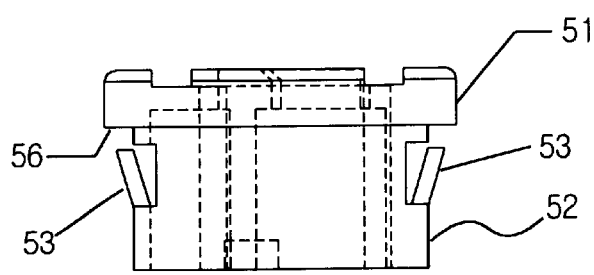
FIG. 21b is a section view of a disk-type receptacle.

FIGS. 21a and 21b show a typical disk type receptacle, which is able to rotate on a top surface of the electric outlet. The disk type receptacle comprises a top disk part (51), lower cylindrical body part (52), a pair of outer stoppers (53), sliding grooves (58), prong slots (54) and a ground hole (55). The top disk part (51) forms a disk shape with two prong slots (54) and ground hole (55) for mounting the prongs and a ground probe, and a pair of sliding grooves (58) for sliding the protecting cover. An outer diameter of top disk part (51) having the standard size of the electric receptacle is larger than that of the lower body part (52). The lower body part (52) has a cylindrical shape with a certain length to fit into the next assembly of electric outlet. A flat seating area (56) is abutted at a right angle to provide a mounting surface between top disk part (51) and lower body part (52). A pair of outer stoppers (53) is provided at opposite ends of each other for retaining the receptacle in an assembly and limiting the rotation to 90°. The disk type receptacle is installed to either one of the rotatable electrical outlets of the fifth, seventh or eighth embodiment of the present invention.

Figure 22A:
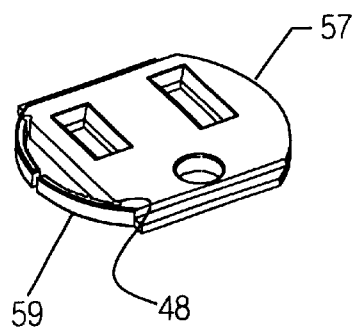
FIG. 22a is a safety device installed on top of the disk-type receptacle.
Figure 22B:
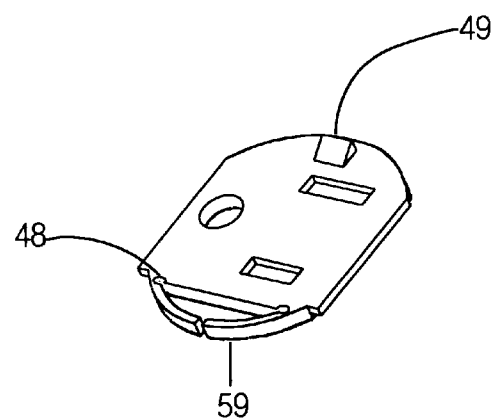
FIG. 22b is a backside view of the safety device.

FIGS. 22a and 22b is a safety device, which is installed on top of the disk type receptacle. It will automatically block the prong slots during unplugging in order to prevent a possible electrical hazard from unexpected children's play. The protecting cover (57) slides along the sliding grooves (58) when a user pushes the protecting cover (57) along the side with the tips of plugs until the blocked slots are completely accessible to plug into. If the user pulls the plug out, the protecting cover will automatically slide back to block the slots with resilient part (59). The root of resilient part (59) has corner cutout (48) to avoid the stress concentration at corner while the resilient part (59) is repeatedly exerting the elastic forces.

Figure 22C:
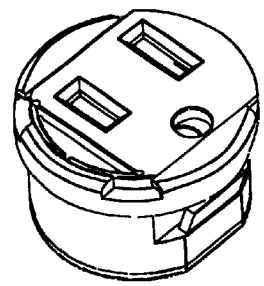
FIG. 22c is a view illustrating the safety device installed to the disk-type receptacle.

FIG. 22c shows the installation of the safety device on top of the disk type receptacle. Once the protecting cover (57) slides into the sliding grooves (58) of the disk type receptacle, a protruded latch (49) disposed underneath the protecting cover (57) snaps into a sliding pocket (50) for latching and limited sliding. A travel distance of the protecting cover (57) is same as the width of prong slot. The resilient part (59) exerts elastic force to block the prong slots during the unplugging.

Figure 23A:
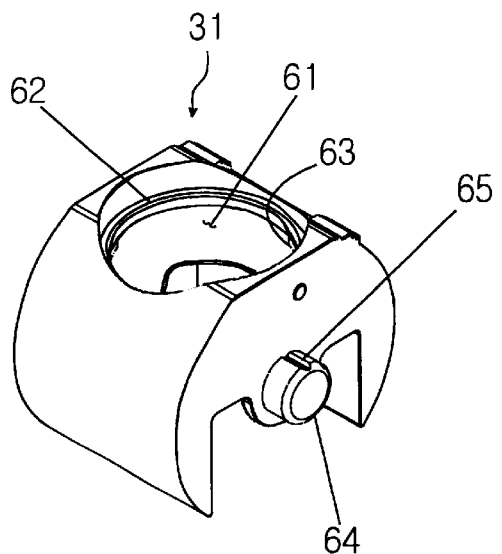
FIG. 23a is a cylindrical-type receptacle installed on top of the rotatable electrical outlets of the seventh or eighth embodiment of the present invention.
Figure 23B:
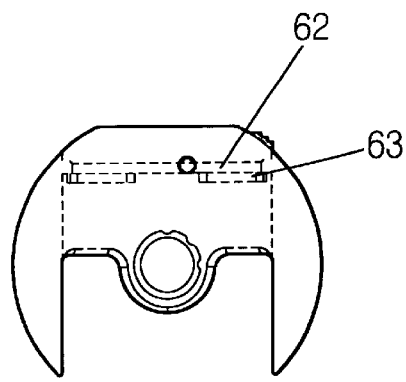
FIG. 23b is a section view of a cylindrical-type receptacle.
Figure 23C:
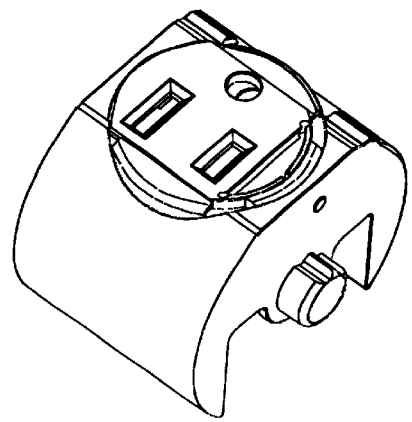
FIG. 23c is a view illustrating the disk-type receptacle installed to the cylindrical-type receptacle

FIGS. 23a and 23b show a typical cylindrical type receptacle being installed into the rotatable electric outlets of the present invention. The cylindrical type receptacle comprises a hollow part (61) for inserting a disk type receptacle (11), an annular rim (62) to match the flat seating area (56) of the disk type receptacle, a pair of inner stoppers (63), and a pair of shafts (64) at both lateral sides for rotation. Each shaft has more than two notches (65) at the positions of 0°, 45° and 90° or 0° and 90° for retaining the cylindrical type receptacle at a proper position. When the disk type receptacle (11) is inserted into the hollow part of cylindrical type receptacle (31), a pair of outer stoppers (53) will snap in to latch underneath the annular rim (62). Then, the flat seating area (56) is mounted on the annular rim (62) of cylindrical type receptacle (31). The inner stoppers (63) disposed underneath the annular rim (62) will contact with the outer stoppers (53) of the disk type receptacle (11) to limit the rotation. FIG. 23c shows the installation of the disk type receptacle being inserted into the cylindrical type receptacle.

Figure 24A:
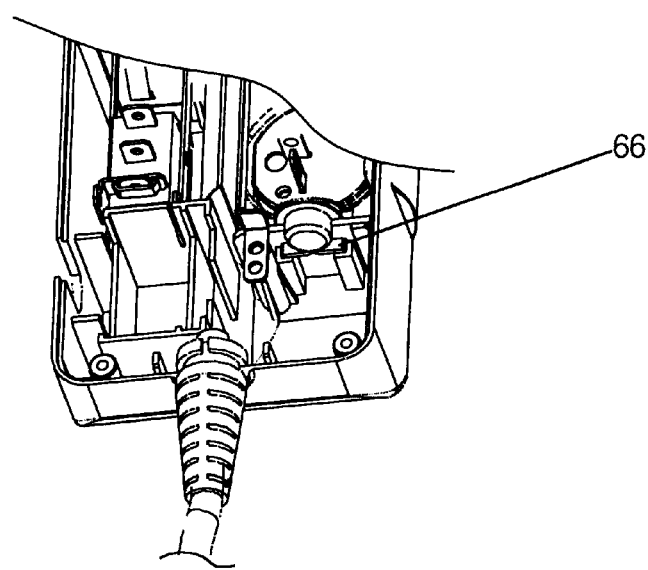
FIG. 24a is a retaining device for retaining the receptacle at a certain position between the top to lateral surfaces.
Figure 24B:
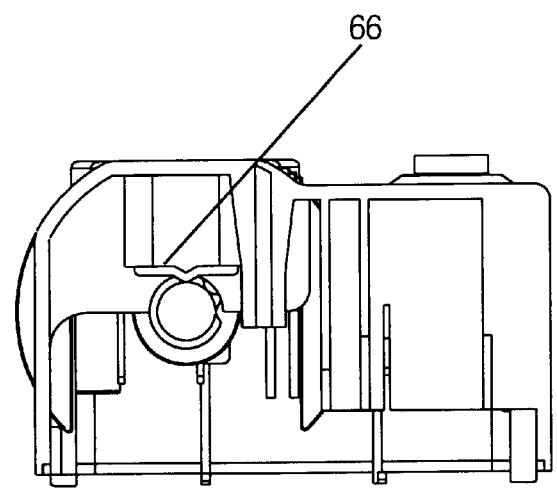
FIG. 24b is a side view of the retaining device.
Figures 25, 26:
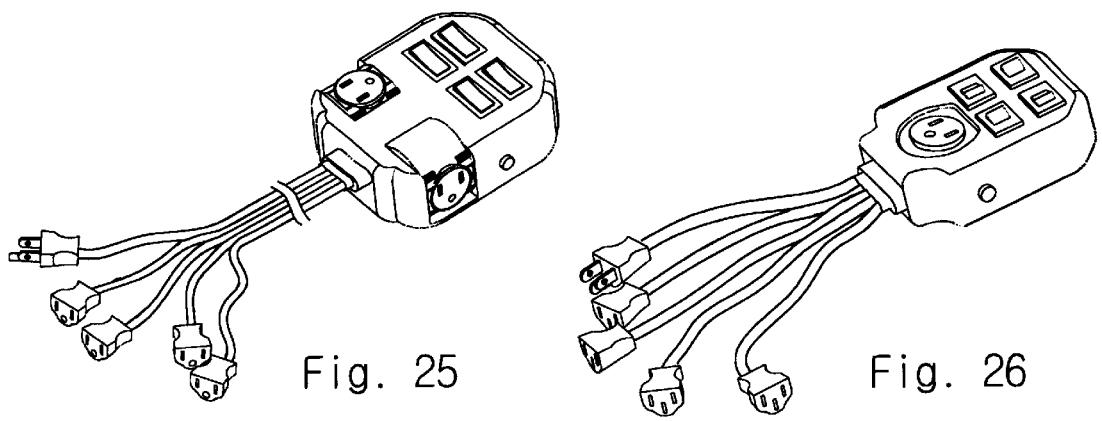
Figure 27:
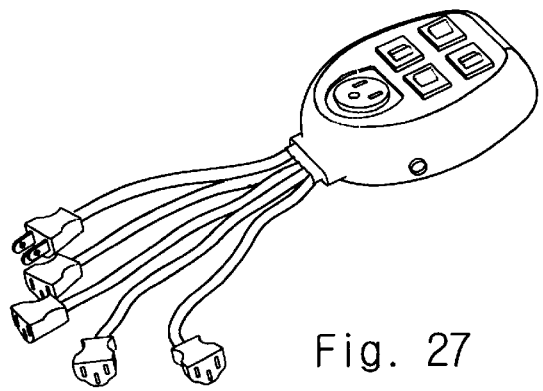
Figure 28:
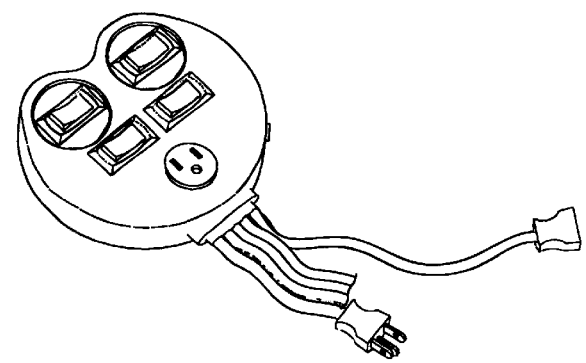
Figure 29:
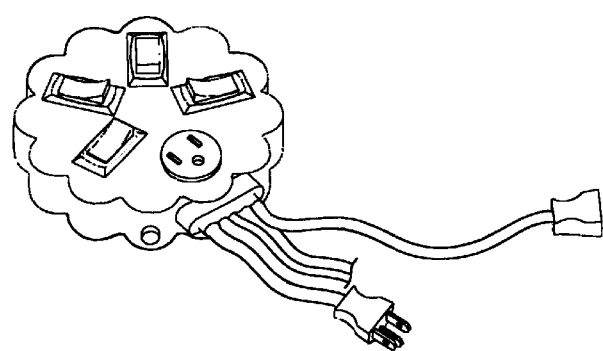
Figure 30:
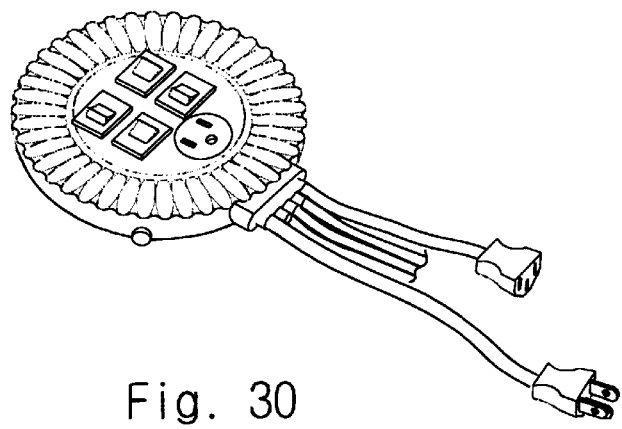
Figure 31:
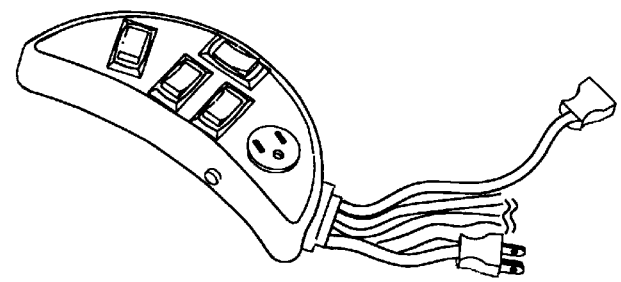
Figure 32:
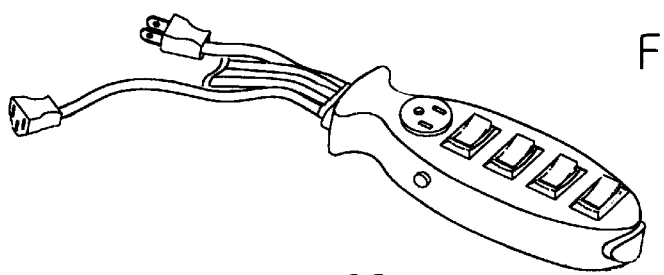
Figure 33:
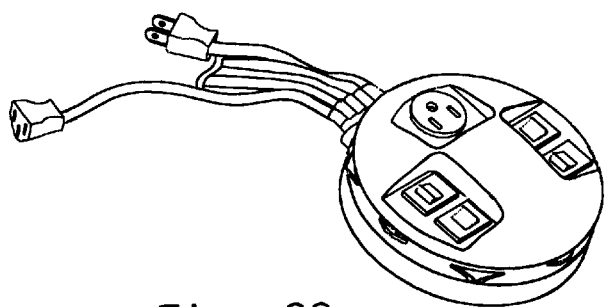
Figure 34A:
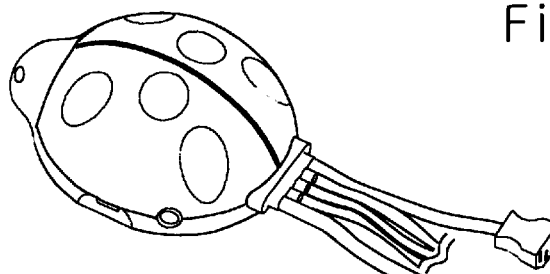
FIG. 34a is a decorative electrical outlet in a ladybug shape with extended female cord.
Figure 34B:
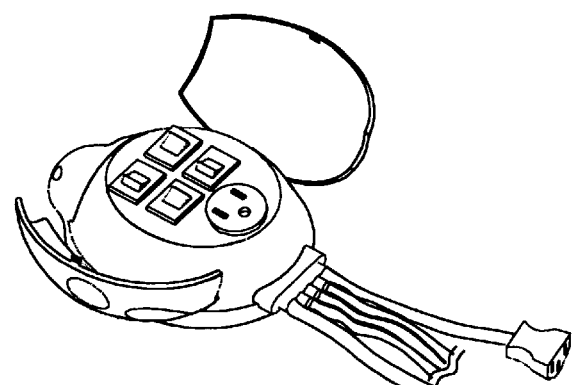
FIG. 34b is a ladybug shaped decorative electrical outlet showing opened lids.

As shown in FIGS. 24a and 24b, a retaining device (66) retains the rotation of the cylindrical type receptacle at a certain position of 0°, 45° and 90° or 0° and 90° between the top surface to the lateral surface of the electric outlet.

Each disk type receptacle (11) and cylindrical type receptacle (31) is designed as an individual unit enabling mass production and easy assembly. The semi-assembly of the disk type and cylindrical type receptacles is inserted into the rotatable electric outlets of the seventh or eighth embodiment of the present invention for the final assembly.

Hereinafter, an application of the electric outlet with rotatable receptacles is described in detail accompanying with FIGS. 25 through 35.

The fancy and whimsical shapes of electric outlets are applies to the electric outlets with rotatable receptacles. The various shapes of these colorful decorative electric outlets with rotatable receptacles are provided. They have animal shapes such as turtle, squid, shell, dolphin tiger, mouse, or fish; insect shapes such as beetles or ladybugs; flower shapes such as sunflower, or daisy; and other shapes such as hamburger, egg, milk bottle, automobile, or beer can etc.

Figure 35:
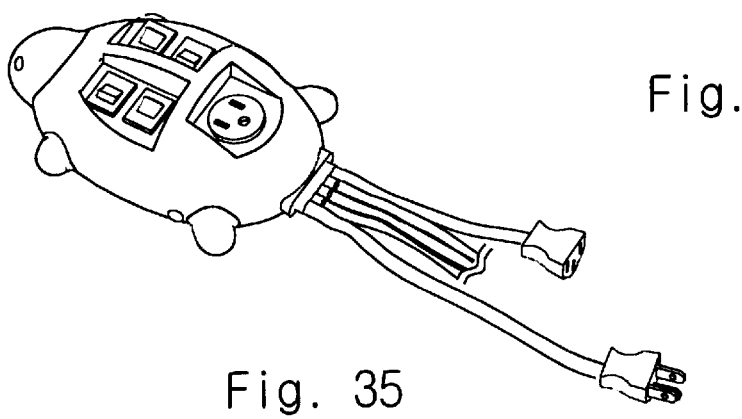

FIGS. 25 through 35 are the various colorful and decorative electric outlets having rotatable receptacles applied to one embodiment of the present inventions with individual switch and remote female cords. The practical application is presented for the examples having various shapes of a compact rectangle (FIG. 25), a compact box (FIG. 26), an oval or mouse (FIG. 27), a heart (FIG. 28), a daisy (FIG. 29), a sunflower (FIG. 30), a banana (FIG. 31), a fish (FIG. 32), a hamburger (FIG. 33), a ladybug (FIG. 34a), a ladybug with opened lids (FIG. 34b), and a turtle (FIG. 35). Those fancy, colorful and attractive shapes of electric outlets are able to hang on the wall for decoration and the remote female plugs with extension cords could be run to reach the appliances. The decorative electric outlets could also possibly provide not only a lid as shown in the ladybug shape with opened lids (FIG. 34b), but also a security video camera.

As discussed above, the present invention has the following advantages: First, a plurality of switches are installed at the power control apparatus which has a plurality of integrated plugs, making it possible to separately and selectively supply the power to a corresponding plug, whereby power consumption and electrical waves are minimized. Second, the plugs are extended at a certain distance from the switches using code lines, so that the power line of the electrical appliance is hidden. Only the switches are exposed to the outside. Therefore, a good outward appearance is obtained. In addition, the plugs of the power control apparatus are out of the reach of children, making it possible to prevent electrical accidents.

Third, in the instances where the user does not wish to change the set states of the switches, namely, in case the on/off states of the switches are not changed, stable set states of the switches are obtained, so that it is possible to implement a reliability of the set states of the switches.

While the present invention has been described in detail with its preferred embodiments, it should be understood that further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. An electric outlet forms with a top cover, base cover, reset, electric cord and a set of circuitry for supplying power, the electric outlet comprises:
    a plurality of receptacles (11) installed in the circuitry of power supply, each of the receptacles capable of being individually rotated at a surface of the top cover,
    a plurality of individual switches (111~114) for turning electric power on and off the corresponding receptacles, rotation of each of the receptacles limited to less than one revolution for preventing twisting of external extension cords or internal electric connections, each of the receptacles forming a top disk part (51), lower cylindrical body part (52), a sliding pocket (50), a pair of sliding grooves (58) and prong slots (54), a ground hole (55) and a pair of outer stoppers (53) disposed at opposite ends from each other for retaining, and a safety device installed on said top disk part (51) for blocking said prong slots during unplugging to prevent a possible electrical hazard.

2. An electric outlet as claimed of claim 1, wherein each of the receptacles has a standard dimension, an outer diameter of said top disk part (51) larger than that of said lower cylindrical body part (52) for providing a flat seating area (56), and said flat seating area (56) abutted at a right angle between said top disk part (51) and said lower body part (52).

3. An electric outlet as claimed of claim 2, further comprises a protecting cover (57) as the safety device installed on said top disk part (51) for automatically blocking the pair of prong slots (54) by resilient part (59) during unplugging for preventing the possible electrical hazard.

4. An electric outlet as claimed of claim 1, further comprises the top cover having various decorative shapes to hang on a wall, the top cover has either one decorative shape of animals, turtle, squid, shell, dolphin, tiger, mouse, fish, insects beetles, ladybug, flowers sunflower, daisy, hamburgers, eggs, milk bottles, automobiles or beer cans.

5. An electric outlet forms with a top cover, base cover, reset, electric cord and a set of circuitry for supplying power, the electric outlet comprises:

a plurality of receptacles (21) being installed in the circuitry of power supply, each of the receptacles capable of being individually rotated from a top surface to lateral surface, a plurality of individual switches (111~114) for turning electric power on and off the corresponding receptacles, rotation of each of the receptacles limited to less than one revolution on a vertical plane with respect to a rotating axis between the top surface to the lateral surface for preventing twisting, bending or breaking of external extension cords or internal electric connections, each of the receptacles (21) having a sliding pocket (50), a pair of sliding grooves (58) and prong slots (54), a ground hole (55) and a pair of shafts (64) at both lateral sides, each of the shafts (64) providing more than two notches (65) for retaining each of the receptacles (21) at a proper position, and a safety device installed on each of the receptacles (21) for blocking said prong slots during unplugging to prevent a possible electrical hazard.

6. An electric outlet as claimed of claim 5, further comprises a protecting cover (57) as the safety device installed on each of the receptacles (21) for automatically blocking the pair of prong slots (54) by resilient part (59) during unplugging for preventing the possible electrical hazard.

7. An electric outlet as claimed of claim 5, further comprises a retaining device (66) elastically retaining each of the receptacles (21) at a certain position between the top and the lateral surfaces by engaging one of said notches (65).

8. An electric outlet as claimed of claim 5, further comprises the top cover having various decorative shapes to hang on a wall, the top cover has either one decorative shape of animals, turtle, squid, shell, dolphin, tiger, mouse, fish, insect, beetles, ladybug, flowers sunflower, daisy, hamburgers, eggs, milk bottle, automobiles or beer can.

9. An electric outlet forms with a top cover, base cover, reset, electric cord and a set of circuitry for supplying power, the electric outlet comprises:

a plurality of receptacles assembled with a disk type receptacle (11) and a cylindrical type receptacle (31) for installing in the circuitry of power supply, a plurality of individual switches (111~114) for turning electric power on and off the corresponding receptacles, each of the disk type receptacles (11) capable of being individually rotated at a top surface, each of the cylindrical type receptacles (31) capable of being individually rotated at a vertical plane with respect to a rotating axis between the top and a lateral surface, rotation of both the disk type receptacle (11) and the cylindrical type receptacle (31) limited to less than one revolution for preventing twisting external extension cord or internal electric connections, and a safety device installed on said disk type receptacle (11) for blocking a pair of prong slots during unplugging.

10. An electric outlet as claimed of claim 9, wherein the disk type receptacle comprises a top disk part (51), lower cylindrical body part (52), a sliding pocket (50), a pair of sliding grooves (58) and prong slots (54), a ground hole (55) and a pair of outer stoppers (53) disposed at opposite ends from each other for retaining inside of the cylindrical type receptacle (31).

11. An electric outlet as claimed of claim 10, further comprising said the disk type receptacle has a standard dimension, an outer diameter of said top disk part (51) larger than that of said lower cylindrical body part (52) for providing a flat seating area (56), and said flat seating area (56) abutted at a right angle between said top disk part (51) and said lower cylindrical body part (52).

12. An electric outlet as claimed of claim 10, further comprising a protecting cover (57) as the safety device installed on said top disk part (51) for automatically blocking the pair of prong slots (54) by resilient part (59) during unplugging for preventing a possible electrical hazard.

13. An electric outlet as claimed of claim 9, wherein the cylindrical type receptacle forms a hollow part (61) for inserting said disk type receptacle (11), an annular rim (62) to match with a flat seating area (56) of said disk type receptacle (11), a pair of inner stoppers (63) and a pair of shafts (64) at both lateral sides being brought to contact each other for limiting rotation.

14. An electric outlet as claimed of claim 13, wherein each of the shafts (64) provides more than the two notches (65) for retaining the cylindrical type receptacle at a proper position, and a retaining device (66) elastically retaining said cylindrical type receptacle at a certain position between the top and the lateral surfaces by engaging one of said notches (65).

15. An electric outlet as claimed of claim 9, further comprises the top cover having various decorative shapes to hang on a wall, the top cover has either one decorative shape of animals, turtle, squid, shell, dolphin tiger, mouse, fish, insect beetles ladybug, flowers sunflower, daisy, hamburger, egg, milk bottle automobiles or beer can.

16. An electric outlet as claimed of claim 9, further comprises a combination of the receptacles which is able to rotate on plan plane and both on plan plane and vertical plane.

17. An electric outlet forms with a top cover, base cover, reset, electric cord and a set of circuitry for supplying power, the electric outlet comprises:
- a switch box (210) being integrally formed by a plurality of individual switches (221~225) in a switch unit (220) for separately supplying electric power,
- a remote plug unit (260) being formed by a plurality of individual remote plugs (261~266) with an extension cord (250),
- said switch box (210), having various decorative shapes to hang on a wall, the switch box has either one decorative shape of animals, turtle, squid, shell, dolphin tiger, mouse, fish, insect beetles ladybug, flowers sunflower, daisy, hamburger, egg, milk bottle automobiles or beer can.

* * * * *